United States Patent
Heinz et al.

(10) Patent No.: US 7,350,344 B2
(45) Date of Patent: Apr. 1, 2008

(54) LAWNMOWER ROTARY CUTTING APPARATUS AND GRASS GUIDE

(76) Inventors: Daniel Charles Heinz, 4303 Florio Dr., Perry Hall, MD (US) 21128; Daniel John Heinz, 659 Shore Dr., Joppa, MD (US) 21085

( * ) Notice: Subject to any disclaimer, the term of this patent is extended or adjusted under 35 U.S.C. 154(b) by 453 days.

(21) Appl. No.: 10/715,192

(22) Filed: Nov. 18, 2003

(65) Prior Publication Data

US 2005/0126149 A1    Jun. 16, 2005

(51) Int. Cl.
*A01D 34/00* (2006.01)
(52) U.S. Cl. ........................ 56/14.3; 56/17.3; 56/320.1
(58) Field of Classification Search .................. 56/255, 56/6, 320.1, 14.3, 17.3, 17.4, DIG. 20
See application file for complete search history.

(56) References Cited

U.S. PATENT DOCUMENTS

| | | | |
|---|---|---|---|
| 2,478,558 A * | 8/1949 | Beranek et al. ............... | 56/17.2 |
| 2,926,478 A * | 3/1960 | Jepson ........................ | 56/10.3 |
| 2,931,156 A * | 4/1960 | Fulwider .................... | 56/320.1 |
| 3,070,938 A * | 1/1963 | Winget .............................. | 56/6 |
| 4,031,696 A | 6/1977 | Fleigle | |
| 4,052,789 A | 10/1977 | Ballas | |
| 4,064,680 A | 12/1977 | Fleigle | |
| 4,987,729 A * | 1/1991 | Paytas .......................... | 56/11.9 |
| 5,007,234 A * | 4/1991 | Shurman et al. .......... | 56/10.2 R |
| 5,109,655 A * | 5/1992 | Tekulve ............................ | 56/6 |
| 5,261,217 A | 11/1993 | Allen | |
| 5,572,856 A | 11/1996 | Ku | |
| 5,761,892 A | 6/1998 | Quiroga | |
| 5,771,669 A * | 6/1998 | Langworthy et al. ............ | 56/6 |
| 6,427,429 B1 | 8/2002 | Brabenec | |
| 6,571,542 B1* | 6/2003 | Fillman et al. ............... | 56/10.6 |
| 6,622,464 B2 * | 9/2003 | Goman et al. ................ | 56/16.9 |

* cited by examiner

*Primary Examiner*—Thomas B. Will
*Assistant Examiner*—Alicia Torres
(74) *Attorney, Agent, or Firm*—Scott Lloyd

(57) ABSTRACT

A lawnmower consisting essentially of a rotary cutting apparatus comprising a plurality of small blades and a grass guide for bending and constraining the grass for ease of cutting. The grass guide is mounted substantially parallel to the drive shafts which extend beyond the rear-most end of the grass guide and to which cutting blades are affixed. As the mower is propelled forward, the grass guide bends the grass forward and constrains movement of the grass such that only a section of the outer radii of the blades contact the grass, optimizing cutting efficiency. The blades may be individually driven by one or more small electric motors powered by a rechargeable battery or batteries or other sources. The grass guide is situated at an angle adjustably tilted between 1 and 90 degrees in the longitudinal direction from vertical in order to limit the cutting area of the blades and power requirements.

14 Claims, 6 Drawing Sheets

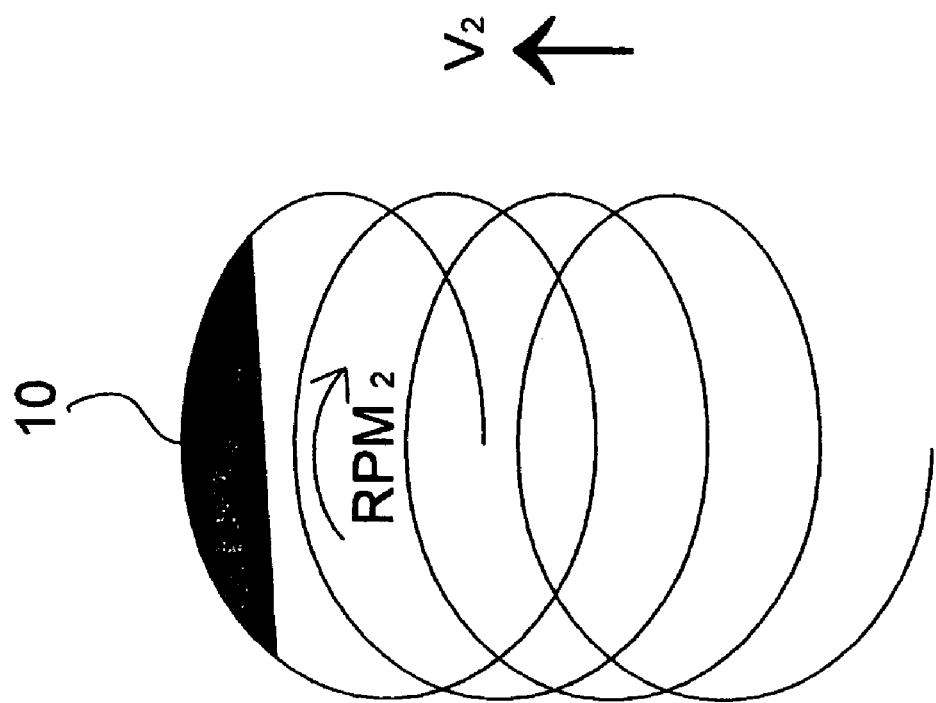
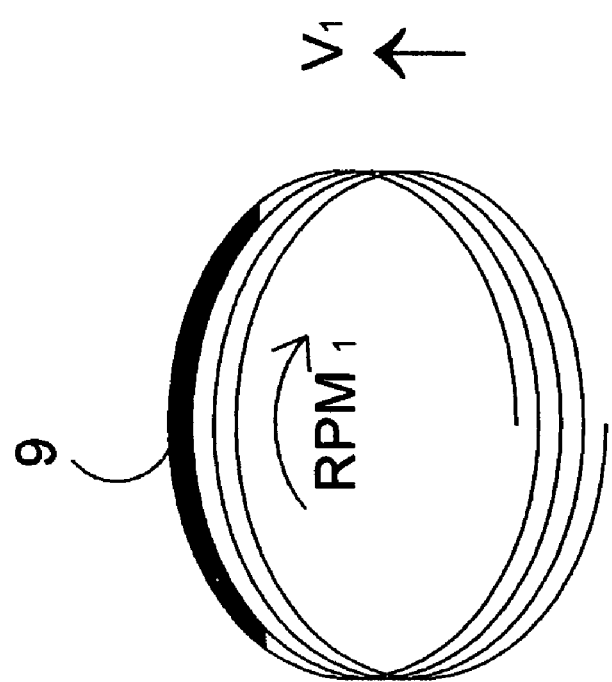
FIG. 2B
FIG. 2A

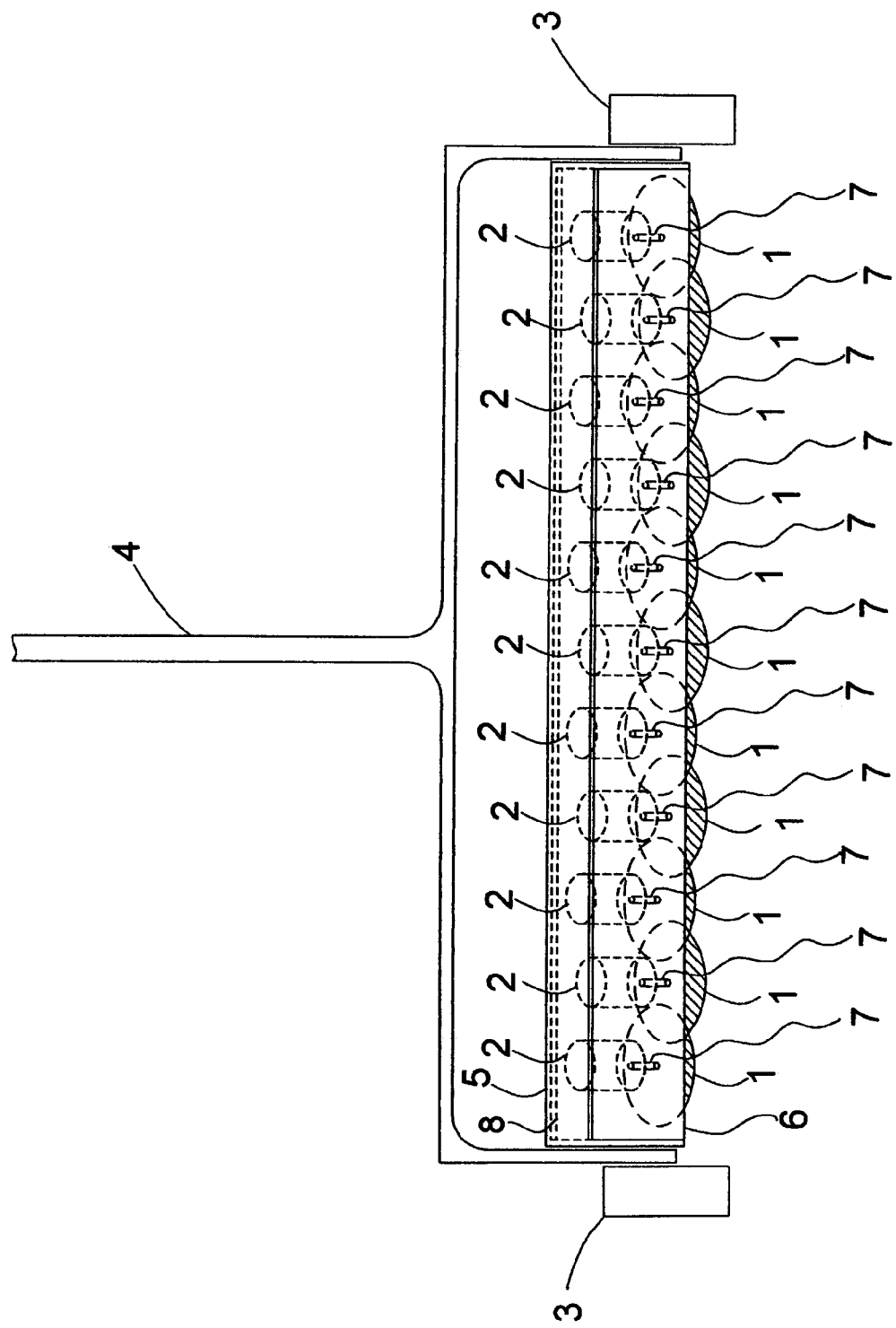

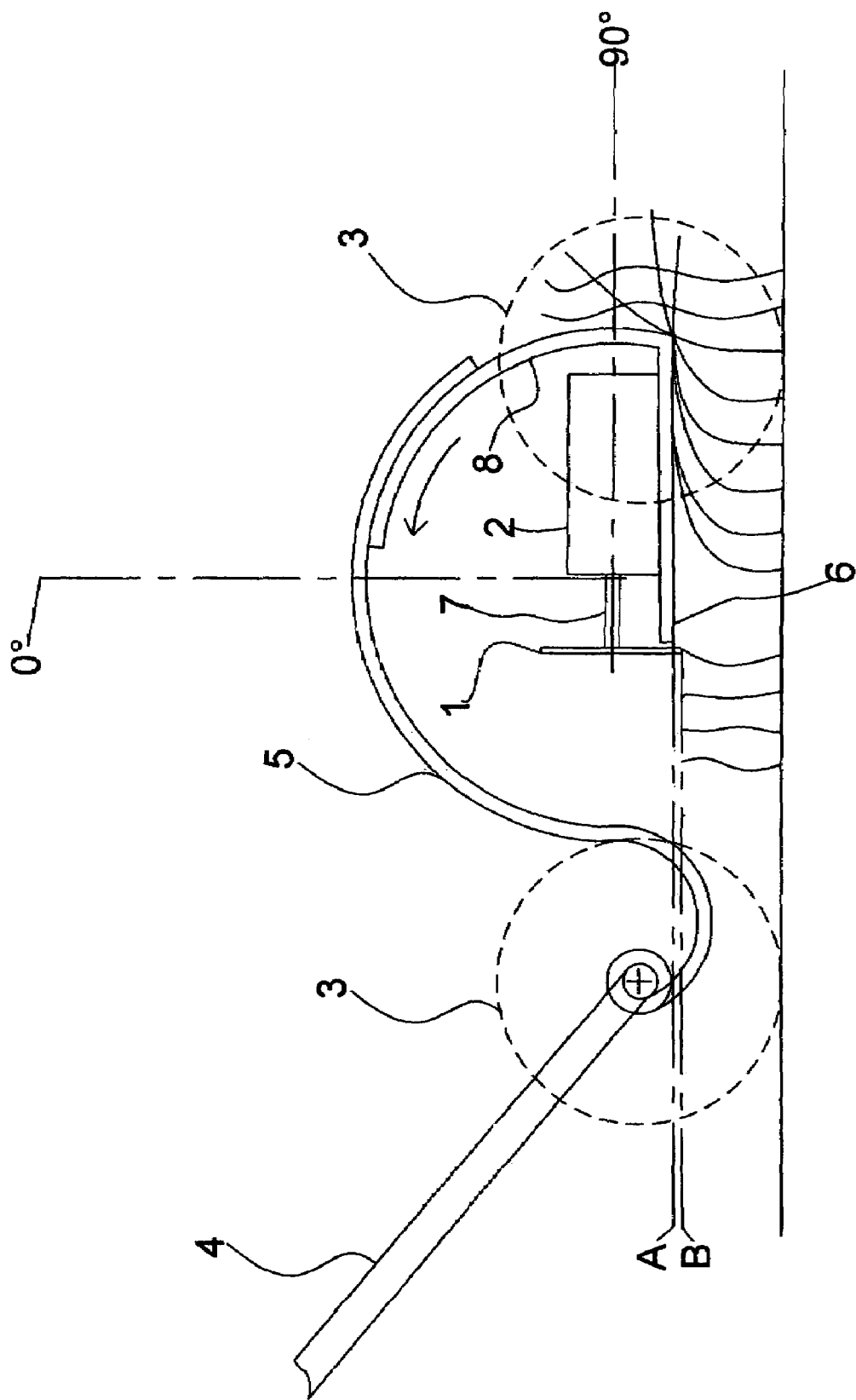

LAWNMOWER ROTARY CUTTING APPARATUS AND GRASS GUIDE

CROSS REFERENCE TO RELATED APPLICATION

This nonprovisional utility patent application was filed within one year of and claims a domestic priority date of Nov. 18, 2003 based on U.S. Provisional patent application Ser. No. 10/715,192, filed Nov. 18, 2003.

STATEMENT REGARDING FEDERALLY SPONSORED RESEARCH

No federal funds were used to sponsor any of the research related to the development of the invention described in this patent application.

NAMES OF PARTIES TO A JOINT RESEARCH AGREEMENT

The development of the invention described in this patent application is not the product of any joint research and development agreement.

BACKGROUND OF THE INVENTION

1. Field of the Invention

Most conventional lawnmowers cut the lawn using one or more large metal blades rotating in a plane of rotation that is substantially parallel to the land surface beneath the grass being mowed. Additionally, most conventional lawnmowers have some type of blade height adjustment. Blade height adjustments are typically achieved by raising or lowering the lawnmower chassis relative to the land surface, and may require a fair amount of time and additional tools. These adjustments can be used to reduce the power required to cut the lawn by raising the blade. However, once a blade height is selected the height and thickness of the lawn and the velocity in which the mower is moved through the lawn determine the blade's cutting area and commensurate amount of power required by the lawnmower. To accommodate the wide variety of grass heights and densities while providing for adequate speed of forward movement to satisfy the user, most lawnmowers are powered by internal combustion engines of significant horsepower. Moreover, mowers utilizing a plurality of large blades, such as riding mowers or large-swath mowers towed by a tractor, typically require gearing mechanisms to achieve increased speeds, and may become bogged down and stall in high, dense grass at high speeds.

Electric motors of equal horsepower are also used to power conventional lawnmowers, but finding an efficacious power source to drive such electric motors has proven challenging. For instance, the batteries required to supply enough power for an adequate mowing time are typically prohibitive in size, weight and expense, while the typical home (20-amperes) circuit restricts power supplied by a power cord. Furthermore, a cord also restricts ease of movement of the lawnmower, as well as the distance the mower can travel from the outlet into which the cord is plugged.

The combination of one or more large blades and a powerful internal combustion engine or electric motor also presents a safety hazard, since the blade is capable of cutting with significant force. A further drawback is the relatively large size and weight of lawnmowers utilizing a powerful internal combustion engine or large electric motor, which reduces the ease of lawnmower operation and storage. With respect to lawnmowers powered by internal combustion engines, a further drawback is that the user typically incurs the cost of purchasing oil and gasoline or other flammable fuel and stores it at his or her home in volumes adequate to fuel the mower for a number of uses, creating a potential fire hazard at the home. Internal combustion engines also produce carbon dioxide emissions which may have a negative impact on air quality and the environment. Finally, when conventional lawnmower blades become periodically dulled and in need of replacement, the blade replacement process may be quite cumbersome to the average user, requiring substantial time and additional tools.

2. Description of the Related Art

U.S. Pat. No. 3,070,938 ("the '938 patent) discloses a lawnmower comprising a plurality of individual blade units that operate together as a unit in order to cut a wider swath than mowers existing in the art at the time of the invention embodied therein. The apparatus disclosed in the '938 patent was designed for attachment to a tractor or other powered vehicle and was designed to be raised and lowered in order to follow the topography of the land surface being mowed. While the planes of rotation of the plurality of blades described in the '938 patent are not at all times perfectly parallel to the land being mowed when the mower is in use, they do remain substantially parallel to the land surface, and the cutting area of each blade of the invention embodied in the '938 patent is thus greater than that of the blades used in the present invention. The reduction in cutting area is a significant feature of the present invention inasmuch as the amount of power required is reduced as compared to the plurality of blades used in the invention disclosed in the '938 patent. This enables the use of alternative power sources such as batteries in the present invention to power the cutting blades while an internal combustion engine powering a separate vehicle is required in order to enable the invention of the '938 patent.

U.S. Pat. No. 5,761,892 (the '892 patent) discloses a rotary blade for a rotary lawnmower that provides an equivalent cut to the invention of the '938 patent with a reduction in necessary driving power. The reduction of power described in the invention of the '892 patent is achieved by affixing a plurality of individual cutting elements to a single support arm rotating about a single rotary drive shaft, each cutting element of sufficient length and projecting downward at a suitable angle such that the cutting elements cut the grass as the support arm rotates at a height above the grass. The present invention differs from that embodied in the '892 patent because each of the plurality of blades has its own drive shaft and the drive shafts are situated at an angle tilted longitudinally between 1 and 90 degrees from vertical. Moreover, each drive shaft of the present invention may be powered by an individual motor that uses only the power necessary to power the blade affixed thereto to cut the grass in its cutting path, thereby increasing the overall efficiency of the apparatus as a whole by requiring only the energy actually necessary to cut the grass in the path of each discrete member of the plurality of blades.

BRIEF SUMMARY OF INVENTION

The present invention is that of a rotary cutting apparatus including a grass guide and means for mounting several drive shafts with cutting blades to the grass guide such that the combination can be adjusted to maximize efficiency and perform with similar efficiency when cutting grass at a variety of heights. In a conventional mower, the blade's drive shaft is arranged such that it remains substantially perpendicular to the blade and horizontal plane of the mower. Therefore, the blade rotates in a substantially horizontal plane. Our invention differs from such conventional mowers because the blades' drive shafts are capable of being tilted and set at any angle between 1 and 90 degrees in the longitudinal direction from vertical. Therefore, the blades in our invention rotate in a plane tilted longitudinally at least 1 degree from horizontal and may be adjusted to varying angles in order to adjust the cutting area of the blades and corresponding power required to cut the grass. (FIGS. 1, 5 and 6). Many present day push and self-propelled lawnmowers have about a 22 inch width which allows the horizontal plane of the mower to remain substantially parallel to the ground plane during use and accommodate the rotational diameter of a relatively large metal blade. The cutting area of the present invention is defined as the total collective cutting area of each of the plurality of blades. The horizontal plane of the present invention also remains substantially parallel to ground plane. While additional blades could be added to make our design wider than the typical 22 inch cutting width, a wider design would be limited to a width that allowed the horizontal plane of the mower to remain substantially parallel to ground plane in order to maximize the benefit of reduced cutting area of each blade while maintaining the uniform cut that is likely to be aesthetically desirable to most users.

More particularly, the rotary cutting apparatus comprises a plurality of small blades affixed to the end of individual drive shafts, with their planes of rotation substantially perpendicular to their respective drive shafts and to the grass guide throughout their range of adjustment (see FIGS. 1, 5 and 6). The grass guide is situated substantially parallel to the drive shafts, positioned at a height suitable for bending grass of sufficient height in the path of the plurality of blades and restricting the motion of the grass for easier cutting. The rotation of the tilted small blades working in conjunction with the grass guide results in a more efficient cutting design by virtue of a reduction in the cutting area of each blade. The grass guide may be set to bend the incoming uncut grass such that the uncut grass is only cut when the tilted blades are in the lower portion of their planes of rotation, reducing the power required by each blade to cut the grass in contrast to a conventional lawnmower, the power requirements of which are determined mostly by the velocity at which a mower is moved through the lawn. Additionally, the movement-constraining function of the grass guide makes it easier for the plurality of blades to cut the grass.

A purpose of the plurality of small blades is a significant savings in required rotational kinetic energy due to the large reduction in mass of the plurality of blades relative to that of a conventional lawnmower blade. Also by virtue of the large reduction in mass of the plurality of blades, as well as a reduction in the mass of the required power source relative to a conventional lawnmower (e.g., a plurality of small electric motors instead of an internal combustion engine), the lawnmower embodied herein is smaller, quieter, lighter and easier to operate and store than a conventional lawnmower. Moreover, the plurality of electric motors utilized in a preferred embodiment of this invention would produce no carbon dioxide emissions, conferring upon it an environmental advantage over conventional lawnmowers.

Another purpose of this novel lawnmower is to improve operating safety over that of traditional mowers by using a plurality of small blades operating with significantly less power than a conventional lawnmower. At least one published study indicates that some 80,000 Americans visited emergency rooms in 2004 as a result of lawnmower injuries, and that such injuries have been on the rise.

BRIEF DESCRIPTION OF THE SEVERAL VIEWS OF THE DRAWINGS

FIG. 2A is a top view of the blade's cutting area in black as a lawnmower is moved forward at a velocity $v_1$ and rotating at $RPM_1$ for a single blade of the preferred embodiment of the present invention.

FIG. 2B is a top view of the blade's cutting area in black as a lawnmower is moved forward at a velocity $v_2$ and rotating at $RPM_2$ for a single blade of the preferred embodiment of the present invention.

FIG. 4 is a front view of a lawnmower utilizing the rotary cutting apparatus and grass guide of the present invention, with the cutting areas of the blades shown by cross-hatching.

FIG. 6 is a side view of a lawnmower utilizing the rotary cutting apparatus and grass guide combination of the present invention. In this Figure the axis of the drive shafts is adjusted to 90 degrees from vertical.

DETAILED DESCRIPTION OF THE INVENTION

Figure 1:
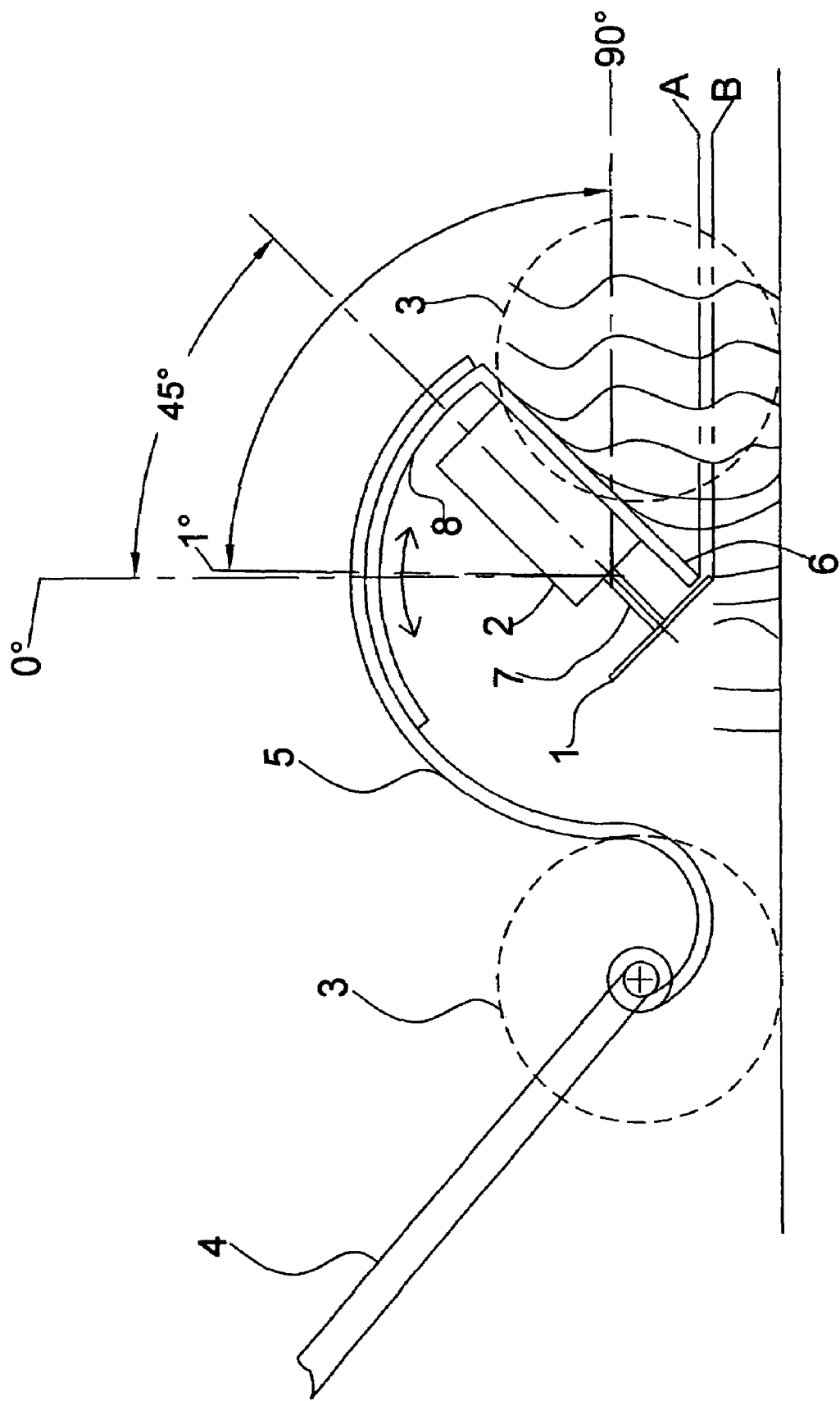
FIG. 1 is a side view of a lawnmower utilizing the rotary cutting apparatus and grass guide combination of the present invention. In this Figure the axis of the drive shafts is adjusted to 45 degrees from vertical.

The present invention is that of a rotary cutting apparatus that comprises a plurality of small cutting blades, each cutting blade rotating about the end of a drive shaft driven by a power means, and a grass guide that constrains the movement of the individual grass blades such that the grass blades are cut by a section of the outermost areas of the radii of the cutting blades (see e.g., FIG. 1). The drive shafts may be collectively powered by a single motor, or each drive shaft may be powered by an individual motor that utilizes only the minimum power necessary to cut the blades of grass within the cutting area of the apparatus. An individual motor or a plurality of motors used to power the drive shafts and cutting blades may draw power from any source, including but not limited to an internal combustion engine, a hybrid power source powered by both internal combustion and electricity, an electrical extension cord plugged into an electrical outlet, a fuel cell or cells, a battery or batteries, or a battery or batteries combined with a solar cell or cells, or a solar source alone.

FIG. 1 depicts the side view of the rotary cutting apparatus, and serves to illustrate the benefits and versatility to be derived from the design of the invention. Each cutting blade (1) of the apparatus is mounted to the end of an individual drive shaft (7), the rotation of which is powered by a power means (2), a plurality of small electric motors spanning the width of the apparatus for example, mounted to the grass guide (6). FIG. 1 further depicts a side view of the grass guide (6) as a thin rectangle projecting downward substantially parallel to the drive shafts and continuous with an arched adjustment plate (8) positioned above the assembly of the motors (2), shafts (7) and cutting blades (1). The chassis may include an arched housing (5) that provides an adjustable interface for the arched adjustment plate (8) that allows the angle of the grass guide (6) to be adjusted by sliding the arched adjustment plate back and forth against the arched housing, selecting the desired position, and locking it in place. Such an adjustment is depicted by the double-sided arrow beneath the interface between the adjustment plate and the housing in FIGS. 1, 5 and 6.

Figure 5:
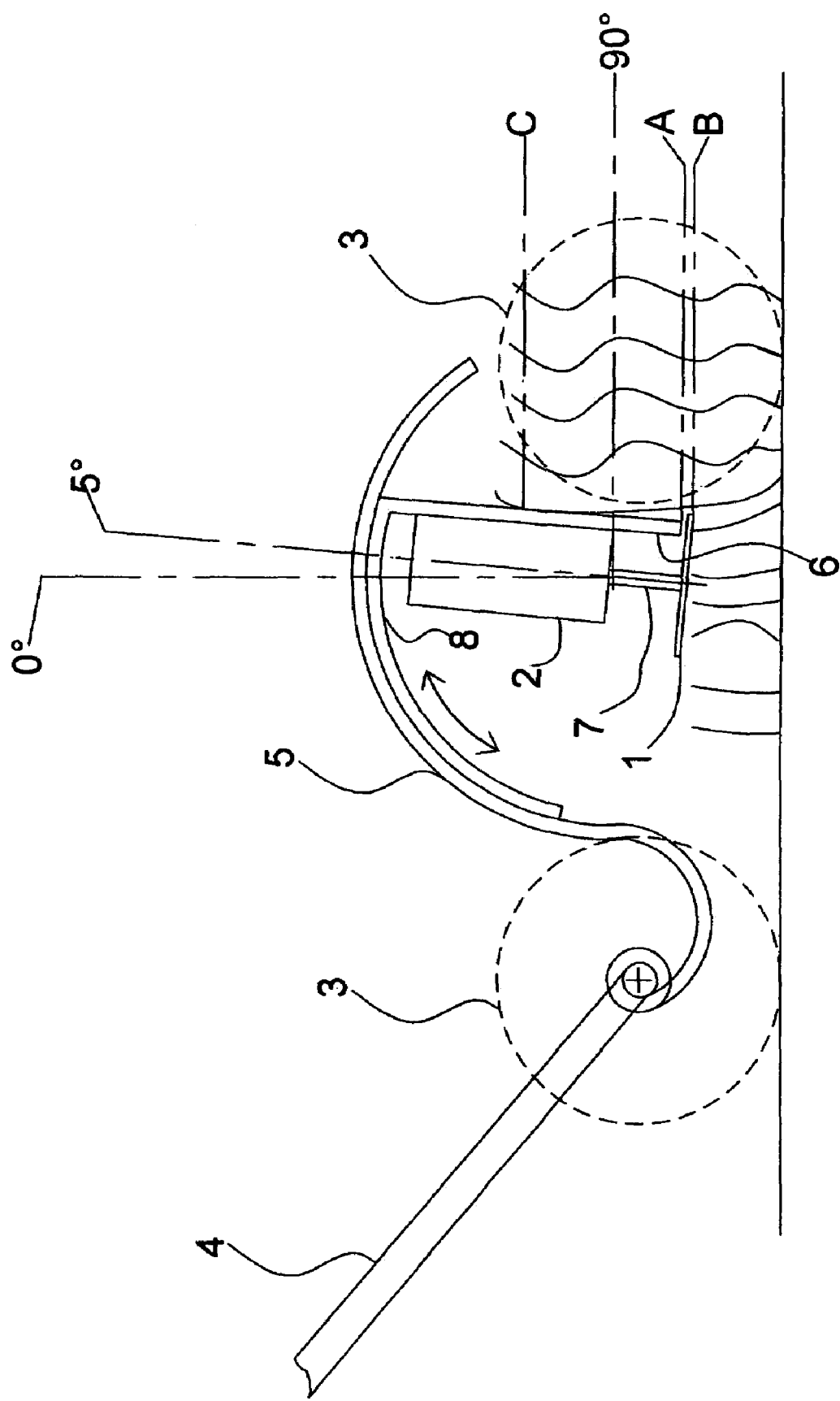
FIG. 5 is a side view of a lawnmower utilizing the rotary cutting apparatus and grass guide combination of the present invention. In this Figure the axis of the drive shafts is adjusted to 5 degrees from vertical.

Wheels (3) may be fixed to the chassis by way of wheel axles. The angular range of 1 to 90 degrees from vertical (designated as 0 degrees) is shown to designate the limits of the adjustment, with two curved, double-sided arrows between 1 or 90 degrees from vertical and the current position of the shaft in the drawing (e.g. 45 degrees in FIG. 1). The full range of angular adjustment is best appreciated by referring to FIGS. 1, 5 and 6 together. In FIG. 5, the angle of the axis of the grass guide and drive shafts is set at 5 degrees from vertical. In FIG. 1, said angle is set at 45 degrees from vertical. In FIG. 6, said angle is set at 90 degrees from vertical. The adjustable mounting surface for the grass guide may be positioned at a high point for ease of access by the end user. FIG. 1 further depicts the handle (4).

FIG. 1 depicts the rotary cutting apparatus and grass guide as a combination that is adjustable as a unit. Individual motors (2) are mounted to the grass guide (6) and substantially parallel with the grass guide (6), and the shafts (7) protrude directly from the motors just beyond the rear-most end of the grass guide such that the blades (1) may rotate without the risk of contacting the grass guide. By providing means for adjustment (indicated by the curved, double-sided arrow beneath the arched adjustment plate (8) in FIGS. 1, 5 and 6) that allows the grass guide to be set at an angle selected from 1-90 degrees from vertical, this combination allows the user to control the cutting area of the blades. By setting the adjustment such that the grass guide bends the uncut grass to about a 90 degree angle with respect to the blades as the apparatus is moved forward, the user reduces the cutting area of the blades to that which is necessary, and thus reduces the energy required to power the mower to that which is necessary.

The rotary cutting apparatus depicted in FIG. 1 has its drive shafts (7) and grass guide (6) adjusted to an angle of 45 degrees in the longitudinal direction from vertical. The cutting blades are arranged substantially perpendicularly to their respective drive shafts. The angular adjustment 1-90 degrees from vertical, see FIGS. 1, 5 and 6) capability allows the cutting area of the blades to be controlled. As the angle is increased the cutting area becomes smaller. The angle of the drive shafts is adjusted to any point within the full range of 1-90 degrees from vertical without affecting the orientation of the remaining components of the apparatus to the ground plane.

In FIG. 1, the nearest motor (power means) (2) is shown mounted to the grass guide (6), and the nearest drive shaft (7) extends downward from the motor in parallel orientation to the grass guide (6), with a cutting blade (1) affixed perpendicularly to the end of the drive shaft (7). As a result, when the angle of the grass guide is adjusted between 1 and 90 degrees from vertical as previously described (FIGS. 1, 5 and 6), the angle of the motor (2), drive shaft (7) and cutting blade (1) is adjusted along with it, and thus the spatial and angular relationships between these parts are maintained throughout the range of adjustment. In FIG. 1 the grass guide (6) is shown as a straight, rigid structure which projects downward at an angle in substantially parallel orientation to the drive shaft (7) and substantially perpendicular orientation to the blades' plane of rotation. In addition, the grass guide, the arched adjustment plate, and the arched housing span the cutting width of the apparatus transversely. FIG. 4 shows the grass guide as a straight structure spanning the cutting width of each blade transversely so that the grass guide bends and constrains uncut grass at an angle between 1 and 90 degrees from vertical, as selected by the user, so that the cutting area of each blade is set to achieve the desired power efficiency. The cutting areas of the blades are depicted by the cross-hatched semicircles.

The location and angle of the grass guide enables it to perform two functions. The first is to limit the cutting area of the blades, thus reducing the power needed to cut the grass. The second is to bend and constrain the uncut grass of sufficient height to contact the grass guide prior to encountering the cutting blades. Upon contacting the grass guide the uncut grass is bent such that its movement is restricted and it is presented to the blades at a more perpendicular angle to facilitate cutting. For example, the grass guide (6) in FIGS. 1, 5 and 6 is shown bending all incoming grass of a height equal to or exceeding that of line A and holding it in a rigid position such that the portion of the blade in the lower portion of the plane of rotation, roughly between line A and line B, contacts the grass, but other portions of the blade do not, thereby limiting the cutting area of the blade and consequently reducing the overall power requirements of the apparatus for cutting grass.

Figure 3B:
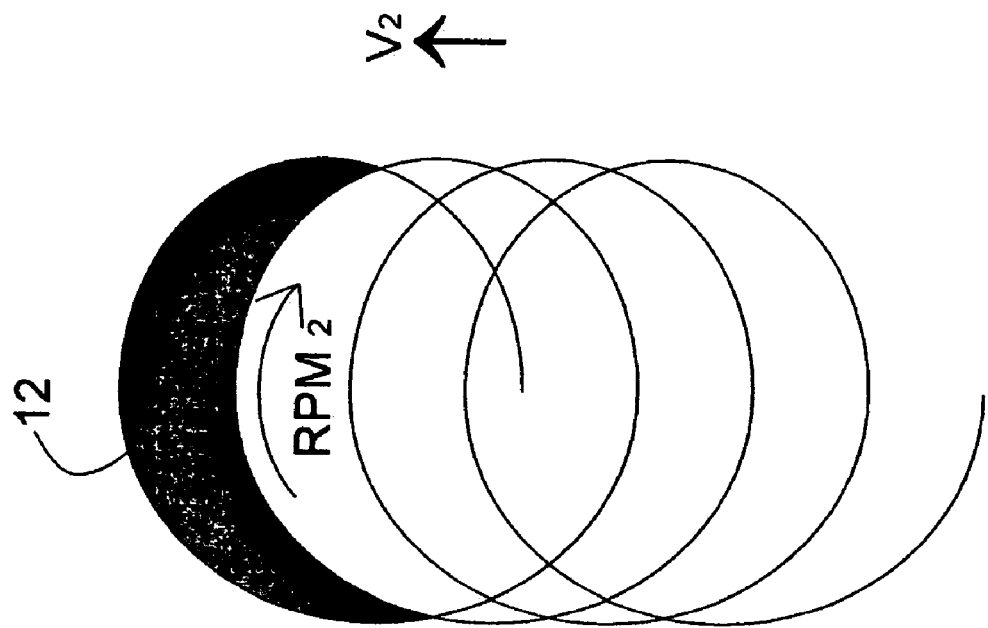
FIG. 3B is a top view of the blade's cutting area in black as a lawnmower is moved forward at a velocity $v_2$ and rotating at $RPM_2$ for the blade of a conventional lawnmower.
Figure 3A:
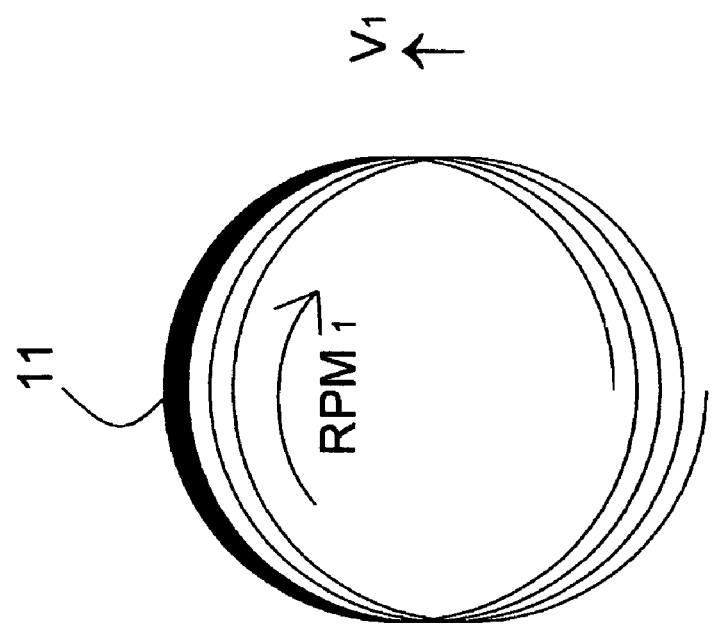
FIG. 3A is a top view of the blade's cutting area in black as a lawnmower is moved forward at a velocity $v_1$ and rotating at $RPM_1$ for the blade of a conventional lawnmower.

FIG. 2A illustrates the cutting area (9) of a single blade as the apparatus is moved forward at velocity $v_1$, with the blade rotating at $RPM_1$ for the present invention. FIG. 2B shows the blade's cutting area (10) as the apparatus is moved forward at a velocity $v_2$, with the blade rotating at $RPM_2$, for a single blade of present invention. In contrast to FIG. 2A, FIG. 3A shows the cutting area (11) of the blade of a conventional lawnmower as it is moved forward at velocity $v_1$, rotating at $RPM_1$, and FIG. 3B shows the blade's cutting area (12) as the conventional lawnmower is moved forward at velocity $v_2$, rotating at $RPM_2$. The important differences between the cutting areas depicted for the blade of the present invention and that of the conventional lawnmower are the shapes and overall areas of the cutting areas indicated by the dark shading. In the present invention, the grass guide extends transversely across the width of each blade and limits the cutting area of each blade of the apparatus to that portion which extends into the space between lines A and B of FIG. 1. Thus the cutting areas of the blades are as depicted in FIG. 2 and FIG. 4, while the cutting area of the blade of a conventional lawnmower is as depicted in FIG. 3. By limiting the cutting area of each blade to that area that extends beyond the grass guide into the space between lines A and B of FIG. 1 to cut grass as the apparatus is moved forward, the overall cutting area, and consequently power requirement, of the present invention is reduced relative to a conventional lawnmower.

In FIG. 2 and FIG. 3, $RPM_2$ is set to have a smaller value than $RPM_1$ and is used to indicate times when the RPM of the blade is reduced due to increased loading as the mower encounters thicker and taller grass. Forward velocity $v_2$ is set to have a larger value than $v_1$ and is used to show the effect of greater forward velocity. FIGS. 2A and 2B serve to further illustrate one of the benefits of the present invention. The grass guide and the angle of the blade from the plane of the cutting surface can be adjusted to reduce the blade's cutting area. This means that in areas where the grass becomes too thick and tall, or when the forward velocity becomes too great some portions of the grass will remain uncut. In other words, this design limits the blade's cutting area. Consequently, the maximum amount of power required can be limited by this design. This is in contrast to a conventional lawnmower in which the blades cutting area is not limited, as shown in FIGS. 3A and 3B. With a conventional lawnmower, in areas where the grass becomes too thick and tall or when the forward velocity becomes too great the mower will stall. In the present invention, the combination of reducing the blade's cutting area and constraining the movement of the grass, both functions of the adjustable grass guide, results in a more efficient cutting design than that of a conventional lawnmower. It is noted that when the grass guide is set at very acute angles such as 5 degrees from vertical as depicted in FIG. 5, it is possible that the cutting area of the blades will not always be limited to the lowermost portions of their planes of rotation. This could be compensated for by decreasing the forward velocity at which the mower is traveling across the cutting surface, or increasing the RPMs of the motors or other power means, and consequently the drive shafts and blades.

FIG. 4 illustrates a plurality of cutting blades (1), a power means consisting of a plurality of small motors (2), wheels (3), a handle (4), a combination chassis and arched housing (5), a grass guide (6), an arched adjustment plate (8), and a plurality of drive shafts (7) driving the cutting blades blades (1). FIG. 5 is a side view of the lawnmower with the drive shaft tilted at an angle of 5 degrees from vertical. FIG. 6 is a side view of the lawnmower with the drive shaft tilted at an angle of 90 degrees from vertical. In FIGS. 1, 5 and 6 two horizontal lines labeled A and B are shown. In FIG. 5 an additional horizontal line labeled C is shown. In each of FIGS. 1, 5 and 6, horizontal line A is drawn at the bottommost portion of the grass guide, and horizontal line B is drawn at the lowest end of the blade when set at the position depicted in the drawing. Line A always remains at a greater height from the ground surface than line B throughout the full range of adjustment of the grass guide (6). This is true for all blades even if the lower ends of each blade are not in perfect horizontal alignment with each other. In FIG. 5, horizontal line C is drawn to indicate the approximate height the uncut grass must be in order to be bent and constrained by the grass guide when the grass guide is set at the depicted angle prior to being cut as the mower is moved forward. FIGS. 1 and 6 show that all uncut grass extending to a height greater than that of line A from the ground plane will be bent and constrained by the grass guide prior to being cut as the apparatus is moved forward when the grass guide adjustment is set at the depicted angles.

This invention ideally uses a plurality of small blades whose outer radii overlap the cutting region of the grass bent and constrained by the grass guide. The plurality of blades provides for an adequate cutting width comparable to that of a conventional manual lawnmower. The rotational kinetic energy of each blade is its ability to do work because of its motion is expressed as Equation 1:

$$K = \frac{1}{2} I \omega^2,$$

where I is the moment of inertia of the blade and ω is its angular velocity. For a rectangular blade with its axis through the center, I, the moment of inertia is expressed as Equation 2:

$$I = \frac{m}{12}(l^2 + w^2 + h^2),$$

where l is the length, w is the width, h is the height or thickness and m is the mass of the blade. The mass of the blade may be obtained by multiplying the density of the blade by the blade volume. The total rotational kinetic energy required by a plurality of small blades is the sum of the rotational kinetic energies required for each small blade. Since the cutting speed of a rotary blade is a function of both the angular velocity and the distance from the axis of rotation, the angular velocity of the plurality of small blades must be increased to be similar to the cutting speed of a single large blade. This increase in angular velocity has the additional advantage of providing greater cutting frequency. By using small, high RPM electric motors, one can easily increase the angular velocity of a plurality of small blades. For the present invention, the angular velocity will be increased, while the largest blade dimension, length, will be decreased relative to a conventional lawnmower. Even though the product of the two squared terms l and ω in Equation 1 will be approximately equal for a conventional mower and the present invention, a large savings in rotational kinetic energy of the present invention will come from a significant decrease of mass, m, in Equation 2.

Increasing the overall angular velocity of a plurality of small blades using a single electric motor or a conventional internal combustion engine may require a gearing mechanism. However, using a plurality of small electric motors has the additional advantage that each motor can be connected directly to the blade's driveshaft and no separate mechanical drive mechanism would be required as with a single motor system. Use of plurality of electric motors results in additional power savings since each motor would independently draw additional current only as its load increased. The reduced weight and size resulting from the use of a plurality of small motors is a further advantage of this design. One of the differences between the present invention and a conventional lawnmower is the overall mass of the blades. By significantly decreasing the mass m in Equation 2 through use of a plurality of small blades, the rotational kinetic energy of the disclosed invention is significantly reduced from that of a conventional mower. An experimental apparatus has been built which demonstrates this significant reduction in required rotational kinetic energy.

The blades, drive shafts, and power means of the present invention are affixed to a chassis, most preferably constructed from durable but lightweight metal or plastic, with a means affixed to said chassis that allows said chassis to move about the ground laterally and longitudinally to facilitate the ability of the blades to cut the grass, wheels for example (FIGS. 1, 4, 5 and 6). As with a conventional lawnmower, a blade height adjustment will be present. A handle may be affixed to the lawnmower in order that a person may be able to more easily push or pull the lawnmower laterally or longitudinally about a land surface in order to cut the grass growing thereon FIGS. 1, 4, 5 and 6). Alternatively, the apparatus may be self-guided about the land surface on which the grass to be cut grows in order to cut the grass, eliminating the need for a handle for manual propulsion.

The use of a smaller, lighter motor or motors relative to those most typical of conventional lawnmowers results in a smaller, quieter, lighter lawnmower, which is easier to operate and store. Another advantage of this design is that the use of a plurality of small blades, operating with significantly less power than a conventional lawnmower, improves operating safety. These improvements in safety, lightness and smallness would benefit both user-operated lawnmowers and self-guiding lawnmowers. Since the total mass and volume of the plurality of small blades will be significantly less than one large blade, new blade designs and different, possibly less expensive construction materials can be used. New small blade designs can further reduce the power requirements. For instance, the blade can be designed aerodynamically to have very little air resistance, thereby further reducing the required rotational kinetic energy. Like a conventional mower the blades can be made from metal, typically hardened steel. However, like an electric or gas trimmer the blades could be made from plastic or metal or some combination of plastic and metal. They could be as simple as a nylon or plastic lines or more complex like a nylon plastic mold with serrated stainless steel inserts. An environmental advantage of using the preferred power source of a rechargeable battery or combination of solar panels and rechargeable battery is that the mower would not produce carbon dioxide emissions and would not require any gas or oil. Since both small and inexpensive blades and motors are currently available, the apparatus can be designed for easy replacement of those components in the event of failure or damage.

The invention claimed is:

1. A rotary cutting apparatus comprising
    an adjustable grass guide consisting essentially of a substantially rigid and rectangular member spanning the cutting width of the apparatus transversely,
    wherein the angle of said grass guide can be adjusted within an angular range of 1 to 90 degrees from vertical and temporarily fixed at any angle within said range,
    a means for adjusting and temporarily fixing said angle within said range,
    a plurality of drive shafts aligned above and substantially parallel to said grass guide and extending rearward of the rear-most point of said grass guide when said angle is fixed at 90 degrees from vertical,
    a means for mounting said drive shafts to said grass guide such that said drive shafts remain substantially parallel with said grass guide throughout its full range of angular adjustment,
    a cutting blade centrally fixed to the rearward-extending end of each drive shaft in substantially perpendicular orientation to said drive shafts and said grass guide,
    wherein the lowest point of each cutting blade extends below said grass guide when said angle is fixed at 90 degrees from vertical,
    a power means driving the rotation of said drive shafts,
    a chassis, and
    a means for effecting movement of the apparatus over a cutting surface.

2. The rotary cutting apparatus of claim 1, wherein said means for adjusting and temporarily fixing said angle within said angular range comprises
    an arched housing spanning the cutting width of the apparatus transversely,
    an arched adjustment plate of similar radius to that of said arched housing and connected to said Mass guide,
    wherein said arched housing and said arched adjustment plate are positioned adjacent to each other such that a portion of each overlaps in with that of the other,
    wherein the angle of said grass guide can be adjusted within an angular range 1 to 90 degrees from vertical by sliding said arched adjustment plate forward and rearward, and
    a means to temporarily fix said grass guide at an angle selected from within said annular range.

3. The rotary cutting apparatus of claim 1, wherein said means for effecting movement of the apparatus over a cutting surface comprises
    a handle to facilitate manual propulsion of the apparatus over the cutting surface and one or more wheels fixed to the chassis by way of wheel axles.

4. The rotary cutting apparatus of claim 1, wherein said power means comprises a single one or more electric motors.

5. The rotary cutting apparatus of claim 4, wherein said motor is or motors are powered by one or more batteries.

6. The rotary cutting apparatus of claim 4, wherein said motor is or motors are powered by
    a combination of one or more batteries and one or more solar cells.

7. The rotary cutting apparatus of claim 4, wherein said motor is or motors are powered by one or more fuel cells.

8. The rotary cutting apparatus of claim 4, wherein said motor is or motors are powered by an electrical extension cord plugged into an electrical outlet.

9. The rotary cutting apparatus of claim 1, wherein said power means consists of an internal combustion engine.

10. The rotary cutting apparatus of claim 1, wherein said power means consists of a hybrid power source.

11. The rotary cutting apparatus of claim 1, wherein said cutting blades are replaceable.

12. The rotary cutting apparatus of claim 1, wherein said power means is replaceable.

13. The rotary cutting apparatus of claim 1, wherein said means for effecting movement of the apparatus over a cutting surface is self-guiding.

14. The rotary cutting apparatus of claim 1, wherein the distance between the plane of rotation of said cutting blades and the rear-most portion of said grass guide is adjustable.

* * * * *

UNITED STATES PATENT AND TRADEMARK OFFICE
CERTIFICATE OF CORRECTION

PATENT NO. : 7,350,344 B2  
APPLICATION NO. : 10/715192  
DATED : April 1, 2008  
INVENTOR(S) : Daniel Charles Heinz and Daniel John Heinz Page 1 of 1

It is certified that error appears in the above-identified patent and that said Letters Patent is hereby corrected as shown below:

Col. 10
In Claim 2, line 7, "Mass" is replaced by --grass.--

In Claim 4, line 25, delete "a single"

Signed and Sealed this

First Day of July, 2008

JON W. DUDAS  
*Director of the United States Patent and Trademark Office*